June 2, 1931.　　　E. B. NOWOSIELSKI　　　1,807,702
TACHOMETER
Filed Feb. 2, 1929
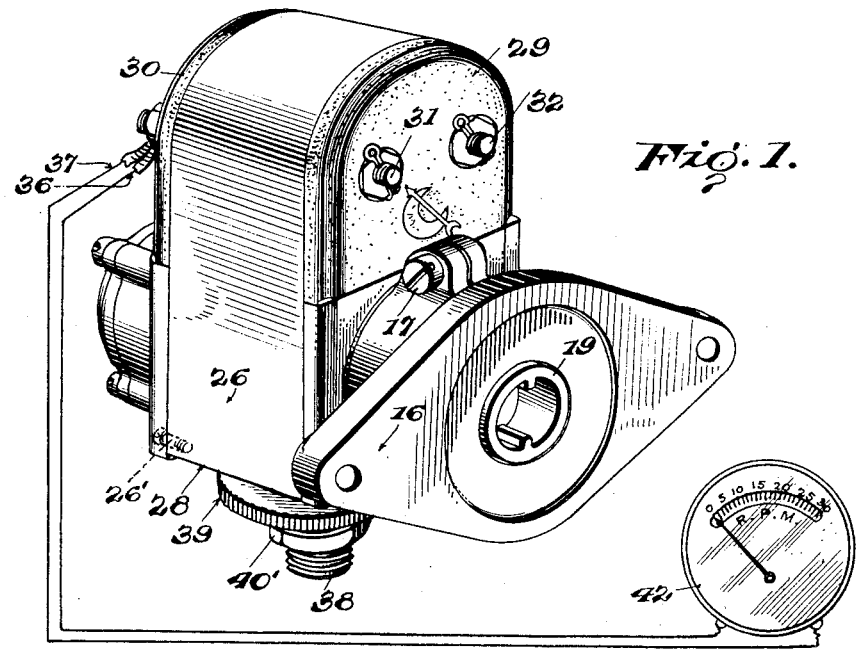
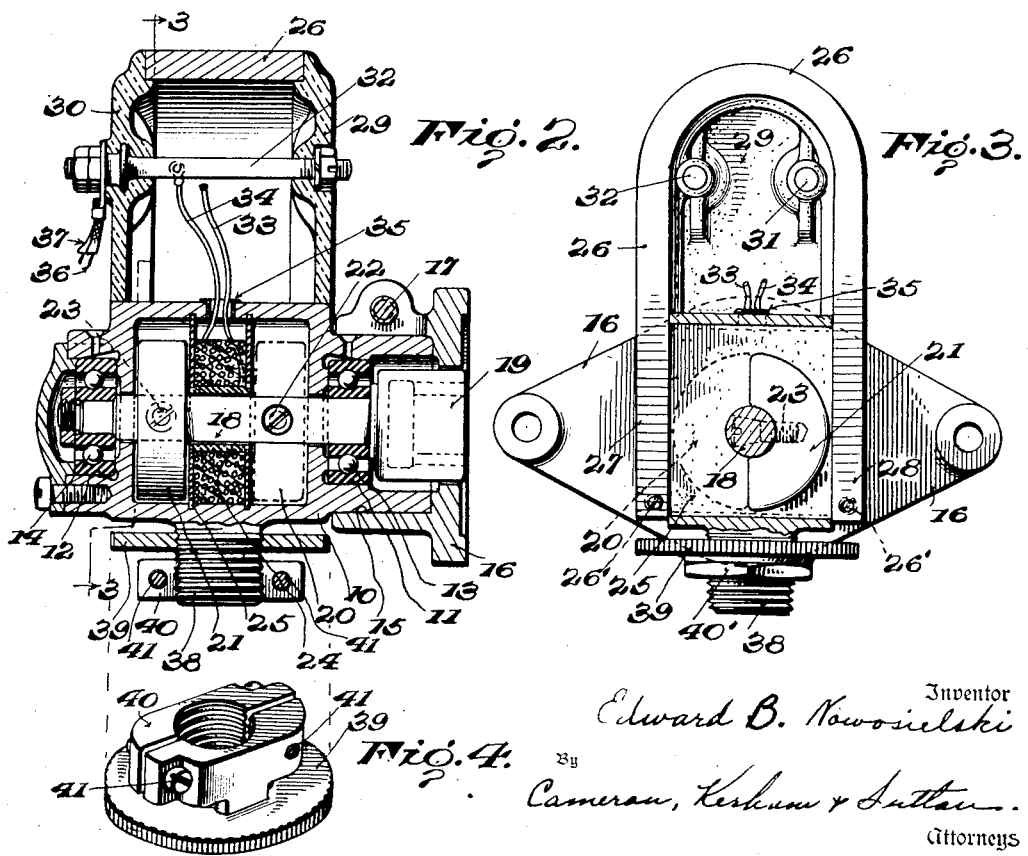
Inventor
Edward B. Nowosielski
By
Cameron, Kerkam & Sutton
Attorneys Patented June 2, 1931

1,807,702

UNITED STATES PATENT OFFICE

EDWARD B. NOWOSIELSKI, OF BLOOMFIELD, NEW JERSEY, ASSIGNOR TO ECLIPSE MACHINE COMPANY, OF ELMIRA HEIGHTS, NEW YORK, A CORPORATION OF NEW YORK

TACHOMETER

Application filed February 2, 1929. Serial No. 337,076.

This invention relates to tachometers, and more particularly to electrical tachometers of the type embodying indicating means adapted to be located at a distance from the actuating means.

One of the objects of the invention is to provide a tachometer of the above type which is small and light but reliable and accurate.

Another object is to provide a remote reading tachometer which does not involve any mechanical transmission elements between the actuating means and the indicating means.

Another object is to provide an electrical tachometer which does not involve the use of brushes, communtators, or slip rings.

A further object is the provision of an electrical tachometer adapted to be readily calibrated with a fine, permanent adjustment without involving the use of variable resistances or moving conductors.

Another object is the provision of an electrical tachometer which is readily adaptable to various relations with respect to the power plant, the revolutions of which are to be registered.

Other objects and advantages will be apparent to those skilled in the art from the following description taken in connection with the accompanying drawings, in which:

Fig. 1 is a view, partly in perspective, of one embodiment of the present invention;

Fig. 2 is a vertical mid-sectional view of the actuating means shown in Fig. 1;

Fig. 3 is a vertical section taken substantially on the line 3—3 of Fig. 2, with a slight structural modification; and Fig. 4 is a perspective view of the calibrating means shown in Fig. 2.

The preferred embodiment of the invention comprises a skeleton frame 10 of suitable non-magnetic material, open at its sides, and provided at its ends with bearing seats 11 and 12 adapted to accommodate antifriction bearings 13 and 14, respectively. One end of the casing is provided with a cylindrical extension 15 on which the mounting flange 16 is adapted to be clamped by suitable means such as a screw 17.

A shaft 18 is rotatably mounted in the bearings 13 and 14, and is provided with a suitable coupling member 19 adapted to engage and be driven by any suitable rotating part of an engine, not shown. A pair of flat, disk-like semi-cylindrical inductors 20 and 21 are mounted on opposite sides of the shaft 18 within the casing 10 and adjacent the ends thereof, being retained in position by suitable means such as the screws 22 and 23 respectively which extend through and have the heads thereof countersunk in shaft 18.

A spool of insulated magnet wire 24 is mounted within the casing 10 as by means of the flanges 25 of said spool fitting within suitable grooves provided in the casing 10. The coil 24 is thus positioned between the inductors 20 and 21, and closely adjacent thereto with the shaft 18 passing freely through the central portion of the spool. It will be understood that in assembling the structure so far described, the spool 24 is first mounted in the casing 10, the shaft 18 is then inserted endwise therein, and the inductors 20 and 21 are thereupon mounted on said shaft.

A field member in the form of a permanent horseshoe magnet 26 of suitable hardened steel is mounted on said frame 10 with its polar portions 27 and 28 closing the open sides of said casing, and is held in position by suitable means such as cap screws 26' passing through the end of frame 10 and engaging the poles of the magnet. Plates 29 and 30 of suitable insulating material are arranged to fit closely on each side of magnet 26 and are clamped together by bolts 31 and 32.

It will be seen that the inductors 20 and 21 and coil 24 form a path for the magnetic flux between the poles of the field magnet 26, and together constitute an armature having rotating poles but a stationary generating coil.

The terminals 33 and 34 of coil 24 are brought up through a suitable opening 35 in the top of casing 10, and are electrically connected to the bolts 31 and 32, respectively, in any suitable manner. The exposed ends of bolts 31 and 32 are provided with suitable attaching means forming binding posts for conductors 36 and 37 which lead to an indicating or recording instrument 42 of any suitable form.

In the embodiment of the invention illustrated the indicating instrument 42 is constructed similarly to an alternating current volt-meter designed to give a full scale reading at the maximum rotative speed for which the tachometer is designed, and calibrated to read directly in hundreds of R. P. M.

The apparatus preferably includes readily adjustable calibrating means. To this end, the bottom of casing 10 is provided with a threaded stud 38 integral therewith or suitably attached thereto. A magnetic shunt member in the form of a knurled disk 39 of suitable magnetic material is threaded upon the stud 38 so as to bridge more or less completely the air gap between the pole pieces 27 and 28 of the magnet 26. The shunt member is provided with suitable locking means such as a threaded extension 40 (Fig. 2) which is split and is adapted to be clamped on the stud 38 by machine screws 41. Fig. 3 illustrates alternative locking means in the form of a jam nut 40' for the shunt member threaded on the stud 38.

In operation, the tachometer is mounted on an engine, for example, by means of the flange 16, with the coupling member 19 in operative engagement with any suitable rotating part of said engine. Rotation of shaft 18 and inductors 20 and 21 by the engine causes the polarity of the inductors to be reversed as they approach successively the opposite poles of the field magnet, thereby reversing the direction of flux through the armature coil 24 and generating therein an alternating E. M. F. of a voltage dependent on the speed of rotation. An alternating current is thus caused to flow through wires 33, 34, bolts 31, 32, and conductors 36, 37 to the indicating instrument 42 whereby the needle of the latter is deflected in accordance with the speed of rotation of the engine member.

In calibrating the tachometer, the generator is rotated at a known speed, the magnetic shunt member 39 is adjusted toward or away from the poles 27 and 28 until the indicator reads correctly, and is then locked in place.

The present invention is particularly adapted for use in multi-engined air craft to indicate to the pilot the amount of power being developed by each of the propelling units. It will be understood that when the invention is applied to an aeroplane or dirigible the actuating units are suitably mounted on and coupled to each engine, and the conductors 36, 37 thereof brought to the instrument panel of the pilot's cabin and connected to the indicating means mounted thereon. The pilot is thus enabled to detect and correct undesired inequalities in operation of the power units, thereby reducing the amount of helm necessary to hold his course and assisting him in maneuvering the ship.

If repeaters are desired at other stations on the ship, other sets of indicators may be installed and wired in parallel, the calibration being repeated if necessary.

Although but one embodiment of the invention has been shown and described in detail, it is to be expressly understood that the illustrated embodiment is not exclusive, and various other embodiments will now suggest themselves to those skilled in the art, while changes may be made in the construction, arrangement and proportions of parts, and certain features used without other features, without departing from the spirit of the invention. Reference is therefore to be had to the claims hereto appended for a definition of the limits of the invention.

What is claimed is:

1. In an electrical tachometer, a permanent magnet having spaced pole pieces, magnetic means arranged to bridge the air gap between the pole pieces and disposed at equal distances from both said pole pieces and adjustable toward and away from said pole pieces to vary the reluctance and the number of lines of force traversing said gap, and common means for supporting said magnet and said means in adjusted relation.

2. In apparatus of the class described, a permanent horseshoe magnet, means for supporting said magnet, said supporting means embodying a portion positioned between the pole pieces of the magnet and projecting therefrom, and adjustable calibrating means carried by the projecting portion of said supporting means and bridging the air gap between the pole pieces of the magnet to vary the strength of the field between said pole pieces.

3. In an electric tachometer, a stationary field member, a stationary armature element within said field member, means for reversing the flux of the field member through said armature element, non-magnetic means for supporting said field member and armature, and means mounted on said non-magnetic means for adjusting the strength of said field flux.

4. In an electrical tachometer, a generator including a permanent field magnet, a generating coil located within the field of said magnet, means for varying the flux of the field through the generating coil, a non-magnetic frame supporting said coil, and means mounted on said frame for adjusting the strength of said field flux.

5. In an electrical tachometer, an actuating unit including a magnetic field element, a generating coil located within the field of said element means for varying the flux through the generating coil, a support for said means and calibrating means in the form of an adjustable magnetic shunt adjacent to said generating coil, said calibrating means being movable on said support.

6. In apparatus of the class described, a permanent magnet, having oppositely disposed polar faces, a frame for supporting said magnet, a coil carried by said frame, a rotatable shaft extending through the coil and supported by said frame, and means for maintaining a magnetic flux path of constant width between said polar faces and said coil, said means comprising a plurality of inductors having arcuate surfaces cumulatively equal in length to the circumference of a circle having the same radius of curvature, said inductors being carried by said shaft.

In testimony whereof I have signed this specification.

EDWARD B. NOWOSIELSKI.